Figure 1:
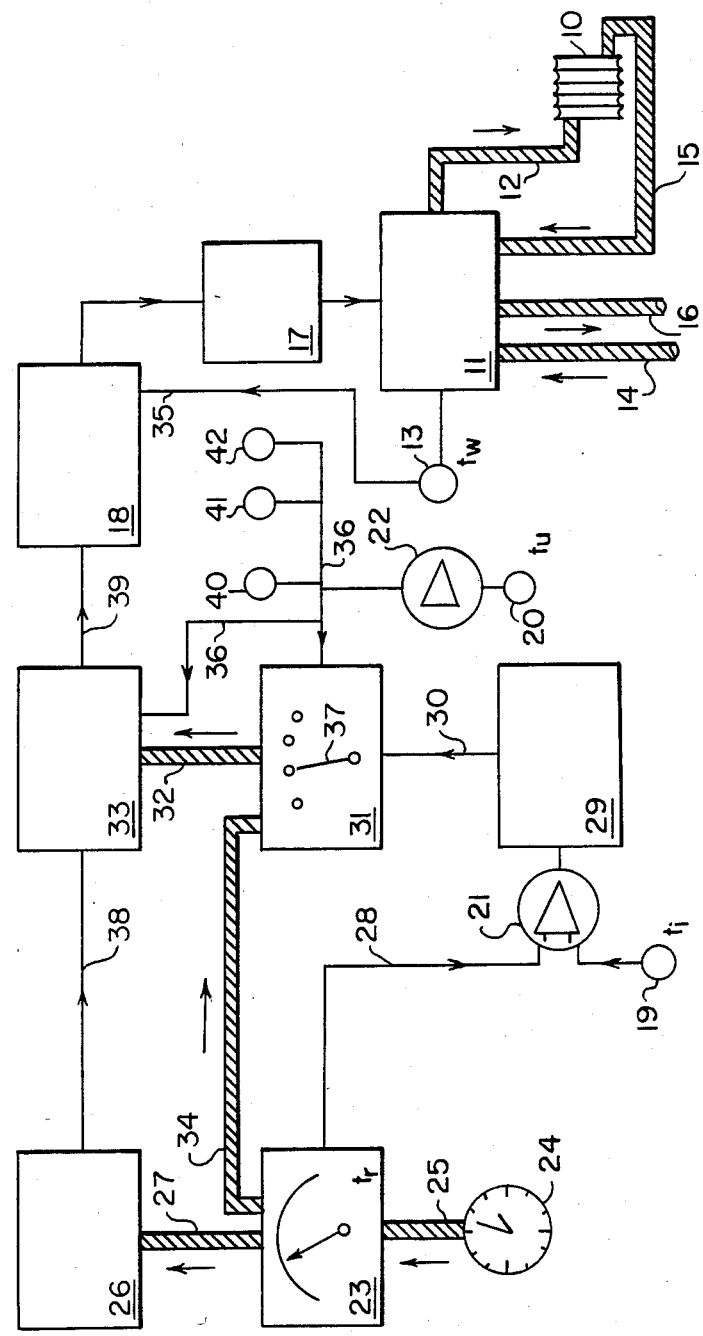

United States Patent [19]

Strand et al.

[11] Patent Number: 4,667,875
[45] Date of Patent: May 26, 1987

[54] TEMPERATURE CONTROL ARRANGEMENT IN HEATING SYSTEMS

[75] Inventors: Rolf E. Strand, Huddinge; Per-Lennart Persson, Tyresö, both of Sweden

[73] Assignee: Tour & Andersson AB, Johanneshov, Sweden

[21] Appl. No.: 707,232

[22] Filed: Mar. 1, 1985

[30] Foreign Application Priority Data

Mar. 2, 1984 [SE] Sweden .................................. 8401173

[51] Int. Cl.$^4$ ........................... F23N 3/00; F24D 3/00
[52] U.S. Cl. ................. 236/46 R; 236/91 F; 237/8 C
[58] Field of Search ............. 236/91 F, 91 G, 91 E, 236/46 R; 237/8 R, 8 C

[56] References Cited

U.S. PATENT DOCUMENTS 3,979,710  9/1976  Jespersen ........................... 236/91 F
4,523,714  6/1985  Isermann ............................. 237/8 R

FOREIGN PATENT DOCUMENTS 3332887  3/1984  Fed. Rep. of Germany ... 236/91 G

*Primary Examiner*—William E. Wayner
*Attorney, Agent, or Firm*—Larson & Taylor

[57] ABSTRACT

This invention regards a control arrangement for heating systems for localities. Heat is given off continuously and the control may take place by changing the temperature ($t_w$) of the heat carrier medium, thereby sensing the interior temperature ($t_i$) in the locality and the outdoor temperature ($t_u$) outside of the locality. A function controller (33) is fed with a known functional relation between the outdoor temperature ($t_u$) and the temperature ($t_w$) of the heat carrier medium. The difference between the existing inside temperature ($t_i$) and the desired inside temperature ($t_r$) is stated, and the functional relation between the outdoor temperature ($t_u$) and the temperature of the heat transfer medium ($t_w$) is divided up into a number of zones, limited from each other dependent upon the difference between the desired inside temperature ($t_r$) and the inside temperature proper ($t_i$).

6 Claims, 3 Drawing Figures

FIG. I

TEMPERATURE CONTROL ARRANGEMENT IN HEATING SYSTEMS

The present invention regards a temperature control arrangement in heating systems, which have for their purpose to heat localities, for instance living houses. In such heating systems, due to the power crisis, one is forced to take steps in order to decrease the consumption of fuel. One such step has been to keep a continuous stream of heat transfer medium. If, as is usually the case, the heating takes place by means of radiators applied in the spaces concerned, thus, hot water is fed to these radiators, which give off heat to the space for compensation of any cooling perhaps occuring. Here, thus, we have immediately two temperatures of importance for the system, viz. the internal temperature $t_i$ in the space, and the temperature $t_w$ of the water, fed to the radiators.

Usually, a reference value $t_r$ is stipulated for the internal temperature $t_i$. In practice, usually the internal temperature $t_i$ does not completely agree with this reference temperature $t_r$, because the air in the locality may be heated or cooled by different circumstances. Most important among these circumstances, usually, is the temperature $t_u$ of the outside air, because the lower this temperature is, the quicker will the air in the locality, controlled as to its temperature be cooled, and the higher the outside air temperature is, the more slowly will the said cooling take place.

There is a rather complicated relation between the said four temperatures $t_i$, $t_w$, $t_r$ and $t_u$, but this is further complicated by different circumstances. Amongst such ones may be mentioned the following ones.

At strong wind pressure on a wall of the locality controlled as to its heat a quicker cooling will take place due to the increased heat convection. At strong moisture in the outside air, also, the cooling will take place quicker. If, on the contrary, there is sunshine, then a given heating will take place on the air in the locality due to radiation, and if a greater number of persons are collected in the locality or if a power consuming machine is started in the locality, then, also, heating will take place by convection.

As especially sensitive difficulty in systems of the above mentioned type will appear in such buildings in which there has been provided a plurality of flats, or with other words in multifamily houses. Here, further complications will appear. For instance, it is not known, where one should place the sensor means for the internal temperature $t_i$. If this is provided in a flat where the inhabitants want a lower temperature and provide this by opening windows to the surrounding outer cold atmosphere, then the indicated inside temperature $t_i$ will be rather low simultaneously as the temperature rises in other flats contrary to what people may desire, living in these other flats and wanting perhaps a more conventional room temperature.

The sensor means for the internal temperature $t_i$, of course, should be applied in some place which may be regarded as representative for all of the building. Therefore, it is not suitable to apply this means only in one single flat in a multi-family house because in this way the state in this flat will dominate the state in the remaining flats in a non-desirable way. In some cases, one may apply this means in some place, common to all of the flats such as in a stair case, but also this is no perfect solution, because, often, the temperature in a stair case is lower than in the flats proper and further it may vary rather irregularily.

One possible solution of this problem would be to provide a sensor for the internal temperature in each of a plurality of flats preferably rather differently situated and, thereby, having different conditions for the internal temperature and to transfer the readings to an apparatus, which will construct the mean value of them and to introduce said mean value into arrangement according to the present invention as an expression for the inside temperature $t_i$.

Another complication occurs if one should in the way, which is usual nowadays, adjust the reference temperature $t_r$ to a higher value in daytime and to a lower value during the night hours. It has even been proposed to use still more reference temperatures, viz. in addition to the two ones mentioned also a morning and/or an evening temperature.

The most sensible disadvantage will, due to the said circumstances, exit in multi-family houses, but also in one-family houses the known arrangements are not completely satisfactory. It has passed, in one-family houses, see for instance the European patent application No. 80.801, that one provided temperature sensors for both the internal temperature $t_i$ and the outside temperature $t_u$ and controlled the room temperature into close agreement with the reference temperature $t_r$ under influence from both the inner temperature $t_i$ and the outside temperature $t_u$, but the arrangements for this purpose were very complicated. And, in multifamily houses one could not at all take into regard the inner temperature because it was impossible to decide were it should be sensed.

An investigation has proved that a direct control of the inner temperature $t_i$ which would mean sensing this temperature and, if it should show a tendency of change, to increase or decrease, respectively, the feed of heat, would scarecely be possible for the reasons mentioned above. Instead the temperature control should take place mainly on basis of the outdoor temperature $t_u$. Nevertheless, however one could allow the inner temperature $t_i$ to influence, to some extent, the function indicating the relation between the outdoor temperature $t_u$ and the temperature $t_w$ of the means by which a compensation is created for the difference between the reference temperature $t_r$ and the inner temperature $t_i$. The temperature $t_w$ of this medium, in the following, will be called "the correction means temperature."

In such a control, therefore, it is necessary to know the functional relation between the inner temperature $t_i$ and the outdoor temperature $t_u$.

Investigations forming basis of the present invention, however have proved not only that this functional relation is very different for different buildings, but also that is in practically all cases represented by a way complicated function which, if expressed in the shape of a mathematical equation, would be of higher degree, and if expressed in the shape of a graph, this would be curved in a shape, which would be different for different buildings. By all this, it has proved extremely difficult to produce apparatus for the purpose capable of being produced in series manufacture because if such an apparatus would be adapted for a given building, it would not be adapted for another one and so on. In addition hereto, such apparatus would be very complicated and, as a consequence thereof, very expensive.

The present invention is based upon an investigation of the factors causing changes of the inner temperature $t_i$. Thereby, it was found that it is not well possible, for the above mentioned reasons, to carry through a control of the inner temperature $t_i$.

It has also been found that the factors causing a change of the inside temperature $t_i$ may be divided up into two different cathegories, viz. the quickly variable ones and the only slowly variable ones. To the first mentioned ones, thus, are counted accidental changes of temperature induced by some of the above mentioned circumstances and they have been found, always to be of rather short duration. To the latter ones, however, are counted in first place variations of the inside temperature caused by climatic conditions in the outside atmosphere of the building, especially the outside temperature $t_u$. In order that the above mentioned influence of the inner temperature $t_i$ on the run at change of the correction means temperature $t_w$, by which a compensation is provided for the difference between the reference temperature $t_r$ and the inner temperature $t_i$ should really be effective, it is also desirable that all accidental variations of the inner temperature $t_i$ and accidental variations of the difference of temperature between the reference temperature $t_r$ and the inner temperature $t_i$ be smoothed out so that they will not at all or anyway to an unessential extent influence the run of the function when determining the correction means temperature $t_w$ dependent upon the outside temperature $t_u$.

The invention is based upon a principle that one has first, as far as possible to disregard the accidental short duration variations of the inner temperature $t_i$ and practically exclusively control the warm water temperature $t_w$ and, thereby, the inner temperature $t_i$ on basis of the stipulated reference temperature $t_r$ and the existing outside temperature $t_u$. For this purpose, one has thus in special order to remove from the the temperature controlling means the accidental shortduration changes in the inner temperature.

Second, the graph symbolizing the relation between the inner temperature $t_i$ and the outdoor temperature $t_u$ should be divided up into zones comprising only part of said graph, and each such zone part should be replaced by a curve of a simpler character, preferably a straight line.

Each of these two steps will cause essential improvements but in combination they will make it possible to simplify the arrangement, still retaining its accuracy and effectivity, such that it will be possible to produce them in series manufacture, whereby they will be possible to use in all or at least the plurality of the existing cases. Thereby, it will only be required that some means contained in them for instance a rheastat, is adjusted as to its resistance value to adapt the arrangement to the specific relations in connection with the building concerned.

Thus, the invention regards a temperature control arrangement for such heating systems which have for their purpose to heat localities with the intention to keep the temperature in the locality at or close to a pre-determined value $t_r$, below referred to as the "reference temperature", heat being continuously fed by means of heat transmitting means situated in the locality and with an intensity controllable for instance by means of the temperature $t_w$ of a heat transfer medium, thereby sensing at least the temperature $t_i$ existing in the locality and the temperature $t_u$ of the outside atmosphere.

The difficulties in providing an apparatus which will give a satisfactory temperature control, thus, depend upon both the existance of accidental, short duration changes of the temperature in the place where the inner temperature is sensed and upon complicated relation between the inner temperature $t_i$ and the outdoor temperature $t_u$, and no simple and reliable arrangement for the purpose concerned can be created unless regard is taken to both of these matters.

According to the present invention a functional relation known in advance is fed over a first channel to a function controller. This functional relation applies to the outdoor temperature $t_u$ and the corrections means temperature $t_w$ and is obtained from a function selector. Over a second channel an expression for the outdoor temperature is fed to same function controller. The functional relation between the outdoor temperature and the correction means temperature are arranged to be divided up in a zone selector into zones, limited dependent upon the difference between the reference temperature $T_r$ and the inner temperature $t_i$. The correction means temperature $t_w$ is determined on basis of the said functional relation. The correction of the inner temperature $t_i$ in the locality is created by means of correction means of the said temperature $t_w$. A sensing takes place for stipulating the difference between the reference temperature $t_r$ and the inner temperature $t_i$ in order that, when equal such temperatures are achieved shall the correction run stop.

Further details of the invention will be apparent from the following description.

Preferably, the division into zones will take place in such a way, that the curve will, within each such zone, appear as a straight line or close thereto, so that said curve may be replaced by the straight line, which is the shape of a curve which is the simplest possible one and the one, which is most easy to imitate by mechanical or electric or electronic means.

The invention will be further described below in connection with a chosen embodiment, which is shown in the attached drawings, but is is understood, that the invention shall not be limited to this specific embodiment, but that all different kind of modifications may exist within the frame of the invention.

In the drawings,

FIG. 1 shows a system according to the invention in block diagram, whereas

Figure 2:
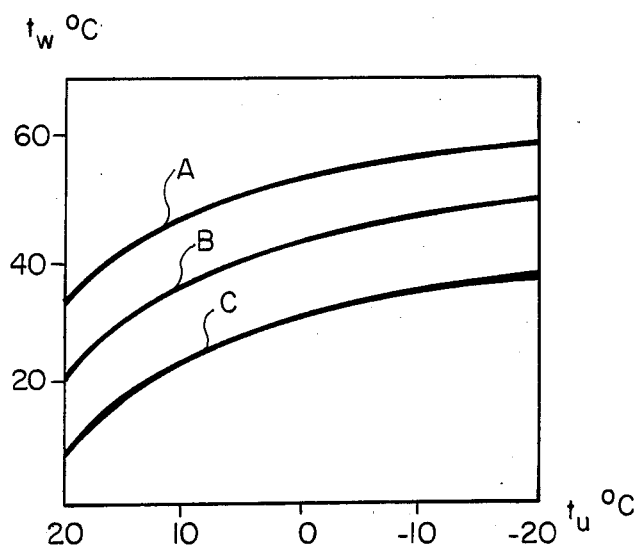
Figure 3:
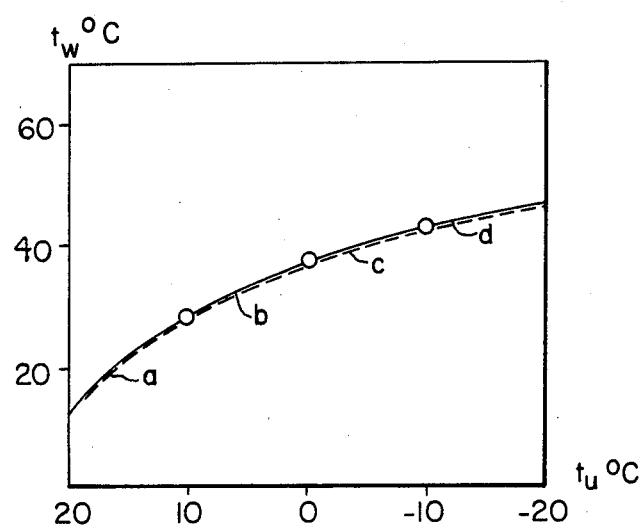

FIGS. 2 and 3 show certain curves for explanation of the function of some of the parts presented in FIG. 1 by means of blocks. It should be observed that these parts are to some extent formed by commercially available electronic coupling elements or by conventional arrangements for heat control and in other parts by means which will on basis of principles well known to the man skilled in the art revert an operation varying according to a given mathematical function into an operation deviating therefrom.

In the arrangement shown in FIG. 1, one single heat radiator 10 is shown, which may be regarded to represent all of the battery of heat radiators, causing the heating of a building. This battery of heat radiators is fed by warm water of the temperature $t_w$ from a shunt valve 11 over a conduit 12. The shunt valve 11 or perhaps the feeder conduit running from the shunt vale 11 comprises a sensor 13 for the temperature $t_w$ of the warm water. The shunt valve receives hot water through a conduit 14 from a boiler, a heat exchanger or the like not shown in the drawing, and also water which has been cooled down, from the return conduit 15 from the battery 10 of heat radiators. Surplus of return water is brought back through the conduit 16 to the source of the hot water in order to be heated anew.

This heating arrangement with shunt valve and battery of heat radiators only forms one example of a heater system for the said locality, and the invention may be equal advantage be used in other heater systems, such as electric heater systems and so on.

It was assumed, in the chosen embodiment, that the shunt valve was adjustable by means of an electric motor 17, which may be brought to move to or from for adjustment of the shunt valve 11. Therefore, through the shunt valve 11 warm water of the temperature $t_w$ will pass continuously to the heat radiators 10, and the control of the heat given off from the heat radiators 10 exclusively takes place by changing the temperature $t_w$ of this warm water which will, thus, in the present case serve as correction means.

The movement of the electric motor is controlled from the motor controller 18, which may, in the simplest form comprise a set, known per se of attraction and release relays.

The inside temperature $t_i$ is sensed in some suitable way by means of a temperature sensor 19, which may be formed by a thermistor and the outside temperature $t_u$ is sensed by another temperature sensor 20 which may also be a thermistor. All such sensors 19, 20 give off a very weak current or voltage, and, therefore, this has to pass an amplifier, for instance a transistor amplifier or an electronic tube amplifier 21 and 22, respectively. It is assumed in the shown embodiment that the amplifier 21 is of the type controlled by two input voltages in order to transmit in its output circuit a mathematical function of them, preferably the difference between them, whereas the amplifier 22 may be a conventional one-way-amplifier.

The reference temperature $t_r$ is adjustable in a reference temperature indicator 23. This may be automatically or manually adjustable. It is assumed, in the shown embodiment, that one may indicate in the reference temperature indicator a number of different reference temperatures $t_r$, one acting during daytime, one acting during night hours and perhaps one or two further ones acting during morning and/or evening time.

The choice between these different reference temperatures is made by means of a control timer 24 which, over the multiple conduit 25 controls the reference temperature indicator 23 such that it will indicate the reference temperature $t_r$ applicable to each separate part of the twenty four hours.

A function selector 26 is arranged in such a way that it will chose a given one of the functions accumulated in the function selector to give the correction means temperature, here, thus, the warm water temperature $t_w$, as a function of of the outdoor temperature $t_u$. This function selector 26 may operate in steps or continuously, and it is preferably formed by some device, known from the data technics. The function selected in the function selector 26, consequently, would also be possible to express in the shape of a curve, which indicates along its horizontal axis one of the magnitudes, e.g. the outdoor temperature $t_u$, and along its vertical axis the other magnitude, in the present case thus the warm water temperature $t_w$.

In FIG. 2, thus, as an example, three such functional curves are shown. They indicate, along the horizontal axis, the outdoor temperature $t_u$ and along the vertical axis the temperature $t_w$ which the water to the heat radiators 10 should have in order of an effective control of the inner temperature $t_i$ taking place. From the three curves shown in FIG. 2, for instance the curve B may indicate the function during daytime control and the curve C the function during night hour control, whereas the curve A shows the function during morning control, when one wants to obtain a quick increase of temperature from the night hour temperature to the daytime temperature.

Of course, the curves A, B and C are individual for each specific case. The curve B, however, regards the result of measurements in a practical case. One has also investigated the influence of other factors and has found, that the curves closely approach to those in FIG. 2. Assuming the curve B to be the standard curve, then, at accidental cooling this curve may be displaced upwardly into the vicinity of curve A and at an accidental heating it may be displaced downwardly into the vicinity of curve C without any essential change of the general shape of the curve.

The choice of the curve A or B or C to be used for determining the function of the arrangement takes place from the reference temperature indicator 23 over the multiple conduit 27.

From the reference temperature indicator 23 a conductor 28 runs to the amplifier 21 so that there will exist in its output circuit a voltage forming a mathematical function of the reference temperature $t_r$ and the internal temperature $t_i$, preferably the algebraic difference between said two temperatures. Due to such disturbances as mentioned above, however, the internal temperature $t_i$ may be provided with superimposed variations both in a direction upwardly and in a direction downwardly.

It must be regarded unsuitable that such variations, which will usually depend from one single flat in a multi-family house, shall be allowed to influence the temperature in other flats situated within same house. Therefore, these variations should be suppressed. Now, it has been observed that such irregularities are always of short duration, whereas, on the contrary, the changes in the interior temperature $t_i$ caused by circumstances, common to all of the house, such as the external temperature $t_u$, are of long duration and will remain for periods of time, which will usually comprise twenty four hours or even more.

For that reason, the voltage given off from the amplifier 21 is conducted to a device 29 for providing slow action or time delay which causes an equalization of the voltage from the amplifier 21 to take place so that accidental variations of short duration of the voltage transferred will be suppressed whereas a mean value for $t_r - t_i$ during a longer period of time will remain. The indication of this value will be transferred over the conductor 30 to a zone selector 31.

The variation proper on basis of the function which has been created in the zone selector 31 is determined by the outside temperature $t_u$ transferred from the sensor 22 over the conductor 36, but a correction of this function may take place in the way mentioned below under influence of the difference of temperature $t_r - t_i$. The function concerned, thus, symbolically , may be represented by means of a curve comprising along the horizontal axis the outside temperature $t_u$ and along the vertical axis the correction means temperature $t_w$. This curve, thus, will scarcely exist in reality but .it only forms a representation of a function, which is created in data technical way within the function selector 26.

The result thus created in the zone selector 31, which will, thus, depend upon the outside temperature $t_u$, is transferred over the multiple conductor 32 to a function controller 33. The curve thus representing the said function in the function controller 33 is found in FIG. 3.

The horizontal axis indicates the outside temperature $t_u$, and along the vertical axis the temperature is plotted which is assumed in the best possible way to cause correction of the erraneuous interior temperature $t_i$. It is know by experience that such a curve is bent in about the way shown in FIG. 3 but, of course, it is individual for each separate building and the curve shown in FIG. 3, therefore, must only be regarded an example of a curve which may satisfy the specific case.

Regarding the unavoidable variations in the shape of the curve in FIG. 3, this curve is not exceptionally exact. Therefore, it may be justified to replace it by a number of consecutive straight lines a, b, c and d of mutually different slope as indicated be dotted lines in FIG. 3. Each such line therefore is called one control zone, which means in reality that the variation of the temperature $t_w$ which should take place at a given variation of the temperature $t_u$ is divided up into a corresponding number of zones. One of these control zones is chosen by means of the zone selector 31. A certain correction of the situation of the transit points between the different zones a, b, c and d takes place by the said difference of temperature $t_r-t_i$, however not until this difference of temperature has been smoothed out in the time delay device 29 in order to remove accidental irregularities. The control zone thus chosen, therefore, is found in the function controller 33, which receives for its operation voltage, corresponding to the outside temperature $t_u$ through the conductor 36. Its output voltage is transferred to the motor controller 18 for controlling the motor 17, adjusting the shunt valve 11.

The advantage of this arrangement is in addition to avoiding the influence of disturbances of the type indicated above that the control will be essentially easier and simpler still maintaining the desired accuracy because the control takes place under maintainance of the desired accuracy by means of linear functions.

The curve shown in FIG. 3, thus, only is one of a plurality of curves, which exist in FIG. 2 or would exist in a corresponding figure, more exactly the curve which will to a higher degree than the other ones be suited for the temporary state of daytime control or night hour control and so on. It has been assumed in the chosen example that the curve may with satisfactory approximation be divided up into four zones, each being replaced by a straight line. The choice of the zone to be used, thus, is dependent upon the value of the outside temperature $t_u$.

Further, however, an indication is also transferred over the multiple conduit 34 for indicating the setting applicable to the reference temperature indicator 23 during the part concerned of the twenty four hours. In this way, therefore, the zone selector 31 will be influenced by a multitude of different factors, viz. over the conductor 30 by a composed voltage determined by the reference temperature $t_r$ and the internal temperature $t_i$, preferably the difference $t_r-t_i$ between the two temperatures, over the conductor 34 by a voltage indicating the part of the twenty four hours during which the control is effected, and over the conductor 36 by a voltage indicating the outside temperature $t_u$ such as this has been observed by means of the temperature sensor 20 after due amplification in the amplifier 22.

From the sensor 13 for the correction means temperature $t_w$ a conduit 35 runs to the motor controller 18 for influencing the operation of the motor 17 in the way mentioned below.

The arrangement now described works in the following way:

At decreasing inside temperature $t_i$ sensed by means of the temperature sensor 19 a voltage indicating this decrease of temperature is fed to the amplifier 21, simultaneously as it receives a voltage over the conductor 28 indicating the reference temperature $t_r$. The amplifier 21, therefore, will comprise in its output conduit a voltage forming a mathematical function, preferably the difference between the two temperatures or with other words $t_r-t_i$. It is reminded that the reference temperature represents the desired inside temperature, and that, therefore, the said difference of temperature represents the error of temperature in the locality.

The reference temperature $t_r$, already, has been adjusted by influence from the control timer 24 to a value which one desires to maintain in the locality during the part of the twenty four hours just running. This temperature, thus, usually is higher at day time and lower during night hours.

By influence from the slow action providing time delay device 29 there will, in the output conduit 30, only appear a smoothed out value of the temperature error $t_r-t_i$. The suppressed variations of short duration have found their reason in disturbances of the interior temperature $t_i$.

The indication voltage from the sensor 20 for the outside temperature $t_u$ amplified in the amplifier 22 is fed, over the conductor 36, to function selector 31 for determining the zone within which the control shall take place. In the drawing this is symbolically represented by means of a switch arm 37 and four contacts, each of which representing one zone, which may be selected.

Thus, it should be observed that the function is derived from the function selector 26, that it is divided up into zones dependent upon the outdoor temperature, and that the zone concerned is derived from the zone selector 31 and, finally, that the function will, within this zone, be modified into a simpler form, preferably a form which may be represented by means of a straight line in a graph, said straight line running between the points of the curve, representing the function, which are indicated as zone limitations by means of the zone selector.

There are cases, for instance in store buildings, where one wants to retain a constant interior temperature but where there is no risk for such quick changes of temperature and, in such a case is it also not necessary to arrange for a smoothing out of such quick changes of temperature, because there are no such ones. In most cases, however, such quick changes of temperature will exist, and if they are not smoothed out in the way, described above, the advantage of the division into zones of the control curves or the function represented by them, respectively, will not apply or only apply to a limited extent.

The primary part of the present invention, therefore, comprises the arrangements for dividing up the function into zones dependent upon the outdoor temperature and activating the control within each such zone by simplified means, preferably by means acting according to a linear function or a first degree curve, but if quick variations of temperature of the type mentioned above exit, then the arrangement has to be provided with an arrangement for smoothing out such quick variations of temperature. This will, in first place, be the case in living flats.

In the reference temperature indicator 23 a reference temperature $t_r$ had been chosen by means of the control timer 24, said temperature representing the interior temperature $t_i$ just now wanted. Under influence of the signals transferred through the multiple conduit 27, therefore, the function is selected in the function selector 26, which corresponds to the chosen reference temperature $t_r$ as indicated in FIG. 2 and this function is transferred to the function controller 33 over the conductor 39. In the function controller 33 a calculation is effected the result of which is fed over the conductor 39 and the motor controller 18 to the motor 17 for starting same in such a direction that the existing temperature error wil be decreased. In the motor controller 18 the indications from the sensor 13 for the correction means temperature $t_w$ is compared with the input indication over the conductor 39 for the result of the calculation in the function controller 33 so that the motor 17 will be stopped when a suitable correction means temperature $t_w$ has been obtained.

When there is no longer any temperature error $t_r - t_i$, said state being observed by the internal temperature $t_i$ being equal to the chosen reference temperature $t_r$, no signal will be fed from the amplifier 21 to the time delay device 29, and, consequently, no signal will be transferred over the conductor 30 to the zone selector 31 or over the conductor 32 to the function controller 33, respectively.

Above, amongst the circumstances influencing the temperature in the locality regard has only been taken to the outside temperature $t_u$, sensed by means of the temperature sensor 20. The inside temperature $t_i$ has no direct influence on the procedure of control, but there will be an indirect influence by said temperature being comprised in the temperature error $t_r - t_i$ and, thus, influence the positions of the zone used in the function controller 33.

In more advanced systems according to the present invention it is suitable, in addition to the out side temperature $t_u$ also to introduce correction factors for other climatic circumstances such as wind pressure, sunshine, moisture in the outside atmosphere, rain and so on. This is well known to the man skilled in the art. Indications for such circumstances, suitably, may be introduced from separate sensors 40, 41, 42 and so on to the zone selector 31 or to any other suitable place in the system.

Above, the system according to the invention has been described as if it would be used in a multi-family house; and it is also in connection to such houses that the invention has its greatest importance. Probably, it would be too complicated and expensive for use in small one-family houses such as villa buildings and the like, but the advantages, nevertheless are so great that it may suitably be used also in larger one-family houses. Therefore, the invention shall not be limited only to use in multi-family houses.

We claim:
1. A temperature control arrangement for a heating system for a building or the like which is used to keep the inside temperature of the building at or close to a predetermined reference temperature comprising:
 a feed means for continuously feeding to the building a heat transfer medium and including a control means for controlling the temperature of the medium and hence the transmittance of heat to the inside of the building;
 an inside sensor means for sensing the temperature inside the building and for producing an inside temperature signal;
 an outside sensor means for sensing the temperature outside the building and producing an outside temperature signal;
 a difference means for producing a difference signal indicative of the difference between the reference temperature and the inside temperature.
 a function controller for determining a desired temperature of the medium and for actuating said control means to produce this medium temperature, said function controller including (a) a function selector for storing a known functional relationship between the outside temperature and the desired medium temperature, (b) an input for the outside temperature signal, (c) means for dividing the known functional relationship into zones represented in a graph by straight lines, said zones being separated from each other dependent upon said difference signal, and (d) a zone selector for selecting one of said zones dependent on said difference signal whereby a desired medium temperature is determined using the selected zone from the determined outside temperature; and
 a stop means for stopping said control means when said reference temperature and said inside temperature are equal.

2. A temperature control arrangement according to claim 1 and further including a reference temperature indicator which produces a signal indicative of the reference temperature selected; and wherein said difference means includes a differential amplifier, said differential amplifier including an input for the reference temperature signal and an input for the inside temperature signal.

3. A temperature control arrangement as claimed in claim 2, wherein said difference means further includes a time delay means for producing a time delayed difference signal in which short term variations of the inside temperature are suppressed in the difference signal produced.

4. A temperature control arrangement as claimed in claim 1 and further including a sensing means for sensing the temperature of the medium and producing a medium temperature signal; and wherein said control means includes a shunt valve means for determining the mixture of cooled medium returned from the building and medium heated by the heating system, and a motor means for adjusting the shunt valve means until the sensed medium temperature equals the desired medium temperature.

5. A temperature control arrangement as claimed in claim 1 wherein said function controller includes a reference temperature indicator means for indicating a plurality of different reference temperatures depending upon the time of day, and a control timer for indicating the time of day and for causing the reference temperature in said reference temperature indicator to change accordingly.

6. A temperature control arrangement as claimed in claim 5 wherein said function selector stores a plurality of known functional relationships including corresponding zones for each said functional relationship, wherein said function selector includes an input for the indicated reference temperature, and wherein one of said functional relationships is selected according to the indicated reference temperature.

* * * * *